US 11,499,545 B2

(12) United States Patent
Iannotti et al.

(10) Patent No.: US 11,499,545 B2
(45) Date of Patent: Nov. 15, 2022

(54) SYSTEMS AND METHODS FOR PISTON ROD MONITORING

(71) Applicant: General Electric Company, Schenectady, NY (US)

(72) Inventors: Joseph Alfred Iannotti, Glenville, NY (US); Christopher James Kapusta, Delanson, NY (US); Marco Francesco Aimi, Niskayuna, NY (US)

(73) Assignee: General Electric Company, Schenectady, NY (US)

( * ) Notice: Subject to any disclaimer, the term of this patent is extended or adjusted under 35 U.S.C. 154(b) by 663 days.

(21) Appl. No.: 16/517,071

(22) Filed: Jul. 19, 2019

(65) Prior Publication Data

US 2021/0017979 A1 Jan. 21, 2021

(51) Int. Cl.
*F04B 51/00* (2006.01)
*F04B 9/10* (2006.01)
(Continued)

(52) U.S. Cl.
CPC ............... *F04B 51/00* (2013.01); *F04B 9/10* (2013.01); *F04B 17/03* (2013.01); *G01M 15/02* (2013.01);
(Continued)

(58) Field of Classification Search
USPC ........................................................ 73/168
See application file for complete search history.

(56) References Cited

U.S. PATENT DOCUMENTS

| 4,696,489 A | 9/1987 | Fujishiro et al. |
| 6,871,916 B2 * | 3/2005 | Stephane ............. B60G 13/003 73/132 |

(Continued)

FOREIGN PATENT DOCUMENTS

| EP | 3767247 A1 * | 1/2021 | .............. F04B 17/03 |
| WO | 0223135 A1 | 3/2002 | |
| WO | 0177633 A1 | 10/2010 | |

OTHER PUBLICATIONS

Extended European Search Report, dated Nov. 10, 2020, for related EP patent application No. EP 20186789.2 (7 pgs.).
(Continued)

*Primary Examiner* — Clayton E. LaBalle
*Assistant Examiner* — Warren K Fenwick
(74) *Attorney, Agent, or Firm* — Hanley, Flight & Zimmerman, LLC

(57) ABSTRACT

A sensor system for monitoring a condition of a piston rod includes an interrogator system having a first coil winding coupled to a housing and radially spaced from the piston rod such that a gap is defined between the first coil winding and the piston rod. A second coil winding is coupled to the piston rod and is inductively coupled to the first coil winding. The second coil winding is configured to communicate with the first coil winding through a range of linear movement of the piston rod relative to the housing. A sensor is coupled to the second coil winding. The sensor is configured to measure a characteristic associated with the piston rod and generate a current in the second coil winding to transmit, via the inductive coupling with the first coil winding, an electrical output signal associated with the characteristic to the interrogator system.

20 Claims, 7 Drawing Sheets

(51) Int. Cl.
*F04B 17/03* (2006.01)
*G01M 15/02* (2006.01)

(52) U.S. Cl.
CPC ....... *F04B 2203/04* (2013.01); *F04B 2203/09* (2013.01)

(56) References Cited

U.S. PATENT DOCUMENTS

| | | | |
|---|---|---|---|
| 7,347,101 B2 | 3/2008 | Thomson et al. | |
| 7,492,280 B2* | 2/2009 | Horler | G08C 17/04 340/870.3 |
| 8,868,355 B2 | 10/2014 | Huang et al. | |
| 10,225,026 B2 | 3/2019 | Lee et al. | |
| 2004/0012253 A1 | 1/2004 | Gendrin et al. | |
| 2005/0274799 A1* | 12/2005 | Torchalski | G06K 7/10079 235/432 |
| 2007/0068278 A1* | 3/2007 | Liu | G01L 3/10 73/862 |
| 2015/0312654 A1* | 10/2015 | Lee | H01Q 1/2225 340/870.07 |
| 2017/0373766 A1* | 12/2017 | Lee | F02F 3/00 |
| 2018/0278693 A1 | 9/2018 | Binder et al. | |

OTHER PUBLICATIONS

T. M. Reeder et al., "Surface-acoustic-wave pressure and temperature sensors", Proceedings of the IEEE, May 1976May 1976, vol. 64, Issue: 05, pp. 754-756.

Ozbey et al., "A Wireless Passive Sensing System for Displacement/Strain Measurement in Reinforced Concrete Members", Sensors, Apr. 8, 2016, vol. 16, Issue: 04.

Jeremiah et al., "Micro strip Patch Antenna Temperature Sensor" IEEE Sensors Journal, Sep. 2015, vol. 16, Issue: 09.

European Patent Office, "Communication pursuant to Article 94(3) EPC," issued in connection with Application No. 20186789.2, dated Feb. 16, 2022, 5 pages.

* cited by examiner

SYSTEMS AND METHODS FOR PISTON ROD MONITORING

BACKGROUND

The field of the disclosure relates generally to linear drive systems and, more particularly, to a system for monitoring conditions of a piston rod.

At least some known linear drive systems typically include a reciprocating piston that moves axially within a housing and drives a piston rod coupled to the piston. Linear drive systems include, for example, and without limitation, linear actuators, reciprocating engines, reciprocating compressors, reciprocating pumps, motocompressors, hypercompressors, fracturing pumps, etc. In linear actuators, the piston rod is at least partially received within a bore defined by the housing. The linear actuator is generally coupled to a fluid supply system configured to affect the pressure acting on the piston within the bore to drive the piston rod linearly relative to the housing. As the piston rod experiences operational cycles, fatigue loads, e.g., alternating or oscillation loads, occur in the piston rod which may result in outage of the linear drive system. In the absence of a system to monitor conditions related to the piston rod, outages of the linear drive system may be unexpected and may result in unplanned expense. Furthermore, in the absence of a system to directly measure conditions related to the piston rod, a linear drive system cannot be accurately controlled to reduce fatigue loads or other loads on the piston rod. This limits the ability to increase the operational lifecycle of the linear drive system and reduce unplanned outages through control of the operating conditions of the linear drive system.

Further, at least some piston rod monitoring systems use radio frequency antennas to transmit measured data from a reciprocating piston. However, such systems that use electromagnetic waves to transmit data are generally not well-suited for transmitting data in a liquid filled environment. Moreover, such systems generally require that the antennas be within a given range (e.g., determined by the configuration of the antennas) in order to facilitate transmission between the antennas.

Accordingly, it is desirable to provide a linear drive system that includes a piston rod monitoring system that is configured to detect and transmit information corresponding to an operating condition of the piston rod in a liquid filled environment.

BRIEF DESCRIPTION

In one aspect, a sensor system for monitoring a condition of a piston rod positioned within a housing is provided. The sensor system includes an interrogator system including a first coil winding coupled to the housing and radially spaced from the piston rod such that a gap is defined between the first coil winding and the piston rod. The sensor system further includes a second coil winding coupled to the piston rod and inductively coupled to the first coil winding and configured to communicate with the first coil winding through a range of linear movement of the piston rod relative to the housing. The sensor system also includes a sensor coupled to the second coil winding. The sensor is configured to measure a characteristic associated with the piston rod and generate a current in the second coil winding to transmit, via the inductive coupling with the first coil winding, an electrical output signal associated with the characteristic to the interrogator system.

In another aspect, a linear drive system is provided. The linear drive system includes a housing defining a bore, a piston rod positioned at least partially within the bore and translatable within the bore, and a sensor system for monitoring a condition associated with the piston rod. The sensor system includes an interrogator system including a first coil winding coupled to the housing and radially spaced from the piston rod such that a gap is defined between the first coil winding and the piston rod. The sensor system further includes a second coil winding coupled to the piston rod. The second coil winding is inductively coupled to the first coil winding and is configured to communicate with the first coil winding through a range of linear movement of the piston rod relative to the housing. The sensor system also includes a sensor coupled to the second coil winding and the piston rod. The sensor is configured to measure a characteristic associated with the piston rod and generate a current in the second coil winding to transmit, by the inductive coupling with the first coil winding, an electrical output signal associated with the characteristic to the interrogator system.

In yet another aspect, a method for monitoring a condition of a piston rod positioned within a housing is provided. The method includes transmitting a first electrical input signal to a first coil winding. The first coil winding is coupled to the housing and radially spaced from the piston rod, a gap is defined between the first coil winding and the piston rod. The method also includes, generating, from the first electrical input signal in the first coil winding, a second electrical input signal in a second coil winding. The second coil winding is coupled to the piston rod and inductively coupled to the first coil winding through the piston rod. The method further includes transmitting the second electrical input signal from the second coil winding to a sensor. The sensor is coupled to the piston rod and configured to measure a characteristic associated with the piston rod. The method also includes generating, at the sensor, an electrical output signal based on the measured characteristic and the second electrical input signal.

DRAWINGS

These and other features, aspects, and advantages of the present disclosure will become better understood when the following detailed description is read with reference to the accompanying drawings in which like characters represent like parts throughout the drawings, wherein.

Figure 1:
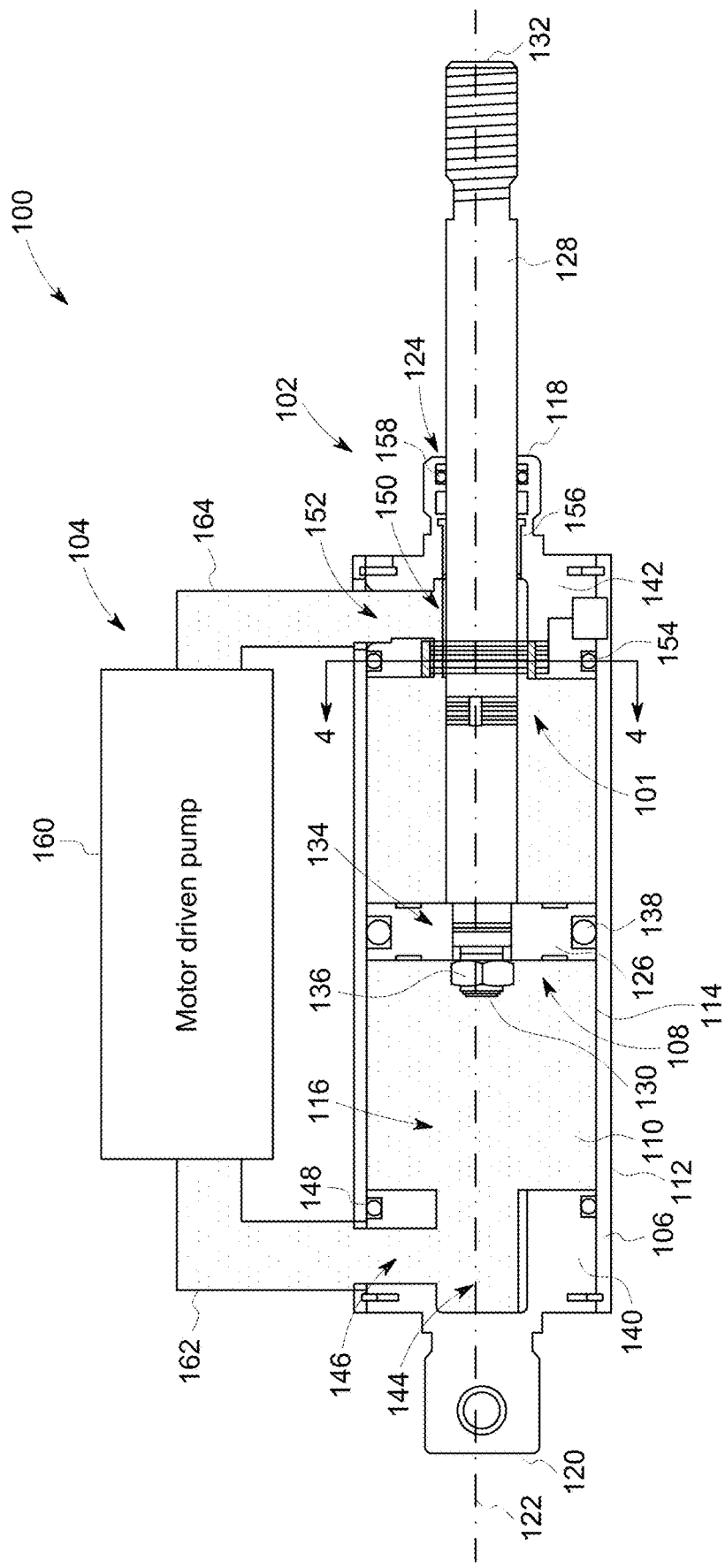
FIG. 1 is a schematic, sectional view of an exemplary linear drive system in an extended position including an exemplary piston rod monitoring system.

Unless otherwise indicated, the drawings provided herein are meant to illustrate features of embodiments of this disclosure. These features are believed to be applicable in a wide variety of systems comprising one or more embodiments of this disclosure. As such, the drawings are not meant to include all conventional features known by those of ordinary skill in the art to be required for the practice of the embodiments disclosed herein.

DETAILED DESCRIPTION

In the following specification and the claims, reference will be made to a number of terms, which shall be defined to have the following meanings.

The singular forms "a", "an", and "the" include plural references unless the context clearly dictates otherwise.

"Optional" or "optionally" means that the subsequently described event or circumstance may or may not occur, and that the description includes instances where the event occurs and instances where it does not.

Approximating language, as used herein throughout the specification and claims, may be applied to modify any quantitative representation that could permissibly vary without resulting in a change in the basic function to which it is related. Accordingly, a value modified by a term or terms, such as "about", "approximately", and "substantially", are not to be limited to the precise value specified. In at least some instances, the approximating language may correspond to the precision of an instrument for measuring the value. Here and throughout the specification and claims, range limitations may be combined and/or interchanged, such ranges are identified and include all the sub-ranges contained therein unless context or language indicates otherwise.

As used herein, the terms "processor" and "computer" and related terms, e.g., "processing device", "computing device", and "controller" are not limited to just those integrated circuits referred to in the art as a computer, but broadly refers to a microcontroller, a microcomputer, a programmable logic controller (PLC), an application specific integrated circuit, and other programmable circuits, and these terms are used interchangeably herein. In the embodiments described herein, memory may include, but is not limited to, a computer-readable medium, such as a random access memory (RAM), and a computer-readable non-volatile medium, such as flash memory. Alternatively, a floppy disk, a compact disc-read only memory (CD-ROM), a magneto-optical disk (MOD), and/or a digital versatile disc (DVD) may also be used. Also, in the embodiments described herein, additional input channels may be, but are not limited to, computer peripherals associated with an operator interface such as a mouse and a keyboard. Alternatively, other computer peripherals may also be used that may include, for example, but not be limited to, a scanner. Furthermore, in the exemplary embodiment, additional output channels may include, but not be limited to, an operator interface monitor.

Further, as used herein, the terms "software" and "firmware" are interchangeable, and include any computer program stored in memory for execution by personal computers, workstations, clients and servers.

As used herein, the term "non-transitory computer-readable media" is intended to be representative of any tangible computer-based device implemented in any method or technology for short-term and long-term storage of information, such as, computer-readable instructions, data structures, program modules and sub-modules, or other data in any device. Therefore, the methods described herein may be encoded as executable instructions embodied in a tangible, non-transitory, computer readable medium, including, without limitation, a storage device and a memory device. Such instructions, when executed by a processor, cause the processor to perform at least a portion of the methods described herein. Moreover, as used herein, the term "non-transitory computer-readable media" includes all tangible, computer-readable media, including, without limitation, non-transitory computer storage devices, including, without limitation, volatile and nonvolatile media, and removable and non-removable media such as a firmware, physical and virtual storage, CD-ROMs, DVDs, and any other digital source such as a network or the Internet, as well as yet to be developed digital means, with the sole exception being a transitory, propagating signal.

The piston rod monitoring systems described herein enable enhanced monitoring of a piston rod of a linear drive system. Enhanced monitoring of characteristics such as strain on the piston rod facilitates determining a condition of the piston rod, such as a load on the piston rod and/or, a stress of the piston rod. For example, the monitoring system described herein or a system in communication with the monitoring system determines the condition of the piston rod based on the monitored characteristic (e.g., calculating stress on the piston rod from a measured strain and the geometry of the piston rod). The condition of the piston rod can include for example, that the piston rod is operating as expected. In one example, monitoring the piston rod also enables determining that the piston rod is not operating as expected. For example, the piston rod may be in a condition that will result in a significant reduction in service life, indicating that servicing of the piston rod or the linear drive system should be performed. In one example, the piston rod is determined to be in a normal condition if a stress calculated from a measured strain is below a predetermined threshold. Accordingly, monitoring the piston rod using the systems and methods described herein may extend service life of the piston rod and/or other components of the linear drive system. Furthermore, monitoring of the piston rod using the systems and methods described herein enables transmitting data and electrical signals to and from a piston rod positioned within a liquid environment (e.g., positioned within an oil filled bore of a linear actuator).

Figure 2:
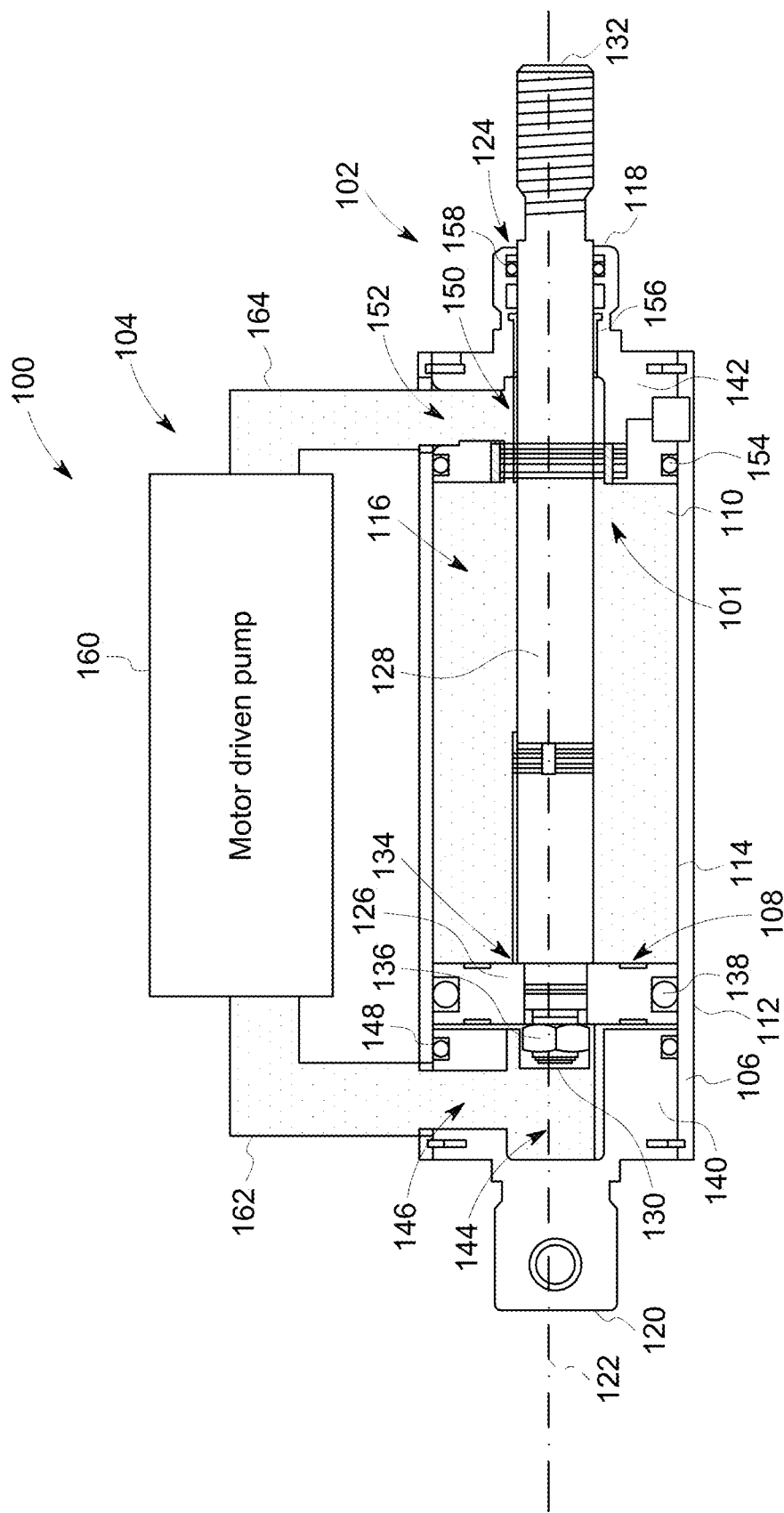
FIG. 2 is a schematic, sectional view of the linear drive system shown in FIG. 1 in a retracted position.

FIG. 1 is a schematic, sectional view of an exemplary linear drive system 100 in an extended position including an exemplary piston rod monitoring system 101. FIG. 2 is a schematic, sectional view of linear drive system 100 shown in FIG. 1 in a retracted position.

In the exemplary embodiment, linear drive system 100 includes a linear actuator 102 and a fluid supply system 104. Linear actuator 102 includes a housing 106 and a piston assembly 108 located within housing 106. Fluid supply system 104 is coupled to housing 106 and configured to supply a fluid 110 to housing 106 to drive piston assembly 108 to drive piston assembly 108 linearly relative to housing 106 during operation. In alternative embodiments, linear drive system 100 is a reciprocating engine, a reciprocating compressor, a reciprocating pump, a motocompressor, hyper-compressors, fracturing pumps, e.g., for use in hydraulic fracturing, or any other linear drive system.

In the exemplary embodiment, linear actuator 102 is a hydraulic actuator configured to drive piston assembly 108 within housing 106 by driving the flow of fluid within housing 106. In particular, in the exemplary embodiment, housing 106 includes an outer surface 112, an inner surface 114, and a bore 116 defined by inner surface 114 within housing 106. At least a portion of piston assembly 108 is received within housing 106. Fluid 110 fills bore 116 such that fluid 110 is configured to exert a force on piston assembly 108 to drive piston assembly 108 relative to housing 106. In the exemplary embodiment, fluid 110 is an oil. In alternative embodiments, fluid 110 is any substance that enables linear actuator 102 to function as described herein. For example, and without limitation, in some alternative embodiments, fluid 110 is a gaseous fluid (i.e., linear actuator 102 is a pneumatic actuator).

In the exemplary embodiment, housing 106 extends between a rod end 118 and a cap end 120. Housing defines a longitudinal axis, indicated generally at 122, extending through rod end 118 and cap end 120. Rod end 118 defines a piston aperture 124 in fluid communication with bore 116 to permit at least partial extension of piston assembly 108 through piston aperture 124 beyond rod end 118 of housing 106.

In the exemplary embodiment, piston assembly 108 includes a piston 126 coupled to a piston rod 128. Piston rod 128 extends longitudinally from a first end 130 to a second end 132. Piston 126 defines an inner aperture 134 through which piston rod 128 extends. In the exemplary embodiment, piston 126 is coupled to piston rod 128 by a fastener 136 (e.g., a nut) proximate first end 130 of piston rod 128. In alternative embodiments, piston 126 and piston rod 128 are formed (e.g., cast or machined) as a single component. In further alternative embodiments, piston 126 is coupled to piston rod 128 in any manner that enables linear drive system 100 to function as described herein. In the exemplary embodiment, piston 126 extends radially outward from piston rod 128. In particular, piston 126 extends radially to inner surface 114 of housing 106 and is configured for low friction movement relative thereto. Piston 126 includes a piston seal 138 circumscribing at least a portion of piston 126 and positioned between piston 126 and inner surface 114 to inhibit fluid flow between piston 126 and inner surface 114.

In the exemplary embodiment housing 106 includes a cap end head 140 and a rod end head 142. Cap end head 140 defines a cap bay 144 and an extension flow port 146 in fluid communication with bore 116. A cap end seal 148 extends circumferentially within cap end head 140 longitudinally between extension flow port 146 and bore 116. Rod end head 142 defines a rod bay 150 and a retraction flow port 152 in fluid communication with bore 116. A rod end seal 154 extends circumferentially within rod end head 142 longitudinally between retraction flow port 152 and bore 116. In the exemplary embodiment, rod end head 142 further includes a rod bearing 156 and an aperture seal 158 each circumscribing at least a portion of piston rod 128. Extension flow port 146 and retraction flow port 152 each extend through inner surface 114 of housing 106 in fluid communication with fluid supply system 104.

In the exemplary embodiment, fluid supply system 104 is coupled to linear actuator 102 and configured to affect the flow of fluid 110 within linear actuator 102 to drive piston assembly 108. Fluid supply system 104 includes a motor driven pump 160, a first supply line 162 coupled to, and extending between, extension flow port 146 and motor driven pump 160, and a second supply line 164 coupled to, and extending between, retraction flow port 152 and motor driven pump 160. During operation, when piston assembly 108 is in the extended position (shown in FIG. 1), fluid supply system 104 is operable to direct fluid 110 via motor driven pump 160 through second supply line 164 to retraction flow port 152 and into bore 116 to apply a force on piston 126 (i.e., increase pressure of fluid 110 to the right of piston 126 as viewed in FIG. 1). The force on piston 126 drives piston assembly 108 to the retracted position (shown in FIG. 2). Likewise, when piston assembly 108 is in the retracted position, fluid supply system 104 is operable to direct fluid 110 via motor driven pump 160 through first supply line 162 to extension flow port 146 and into bore 116 to apply a force on piston 126, thereby driving piston assembly 108 to the extended position (shown in FIG. 1). Fluid supply system 104 is further configured to regulate the pressure of fluid within bore acting on piston 126 to maintain piston 126 in a position (not shown) between the extended position and the retracted position. Fluid supply system 104 is further configured to apply a fixed pressure on both sides of piston 126 (e.g., by maintaining fluid 110 pressure on the left and right side of piston 126 as viewed in FIG. 1) such that a change in force on piston rod 128 causes piston 126 to move within housing 106.

In the exemplary embodiment, linear drive system 100 includes piston rod monitoring system 101. Piston rod monitoring system 101 is a sensor system for measuring a characteristic associated with linear drive system 100. For example, and without limitation, piston rod monitoring system 101 may measure a strain of piston rod 128, a temperature, a pressure of the environment around piston rod 128, piston rod 128 deflection, torque on piston rod 128, bending of piston rod 128, vibration of piston rod 128, and/or other characteristics of linear drive system 100. Piston rod monitoring system 101 is operable to determine a condition of piston rod 128. For example, and without limitation, piston rod monitoring system 101 determines a piston rod load by directly measuring a strain of piston rod 128 and determining piston rod 128 load based on the measured strain and the characteristics of piston rod 128 including, for example, and without limitation, Young's modulus and the geometry of piston rod 128 (e.g., the cross-sectional area of piston rod 128).

Figure 3:
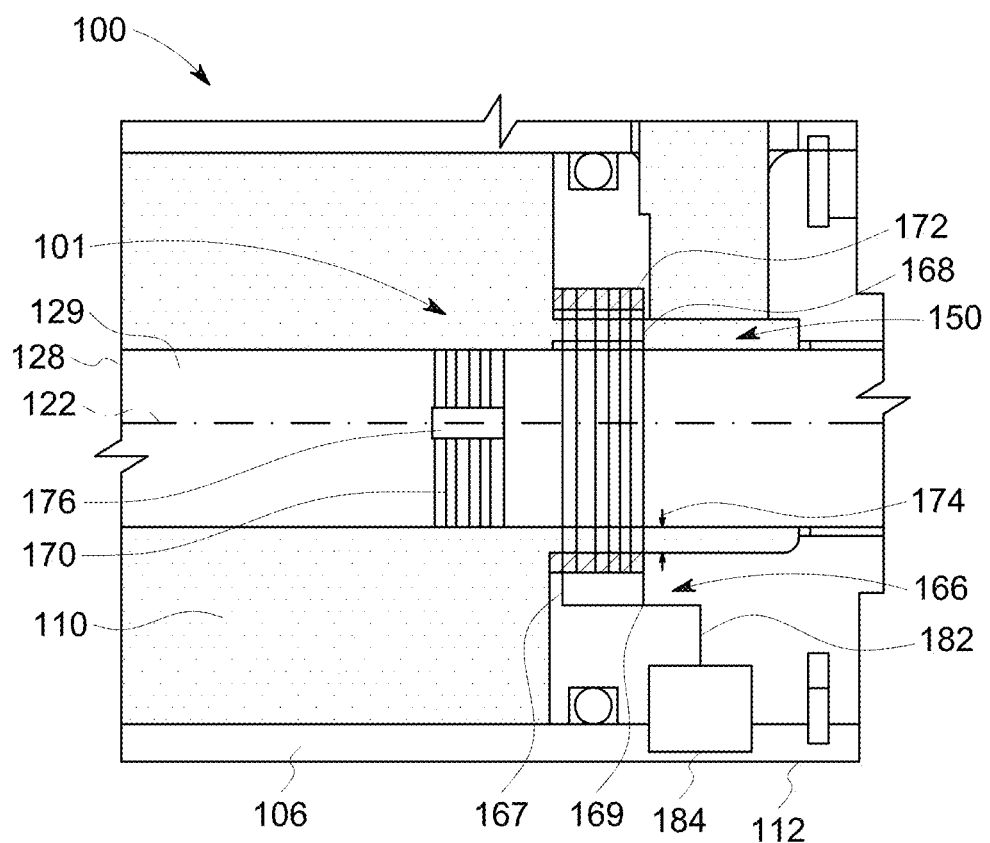
FIG. 3 is a block diagram of the piston rod monitoring system shown in FIG. 1.

FIG. 3 is an enlarged view of linear drive system 100 shown in FIG. 1. In the exemplary embodiment, piston rod monitoring system 101 includes an interrogator system 166 including a first coil winding 168 radially spaced from piston rod 128 and circumscribing piston rod 128. First coil winding 168 is inductively coupled to a second coil winding 170 through piston rod 128. In particular, in the exemplary embodiment, piston rod 128 is formed of a material having a relatively high electromagnetic permeability (i.e., greater than the electromagnetic permeability of atmospheric air). More specifically, in the exemplary embodiment, piston rod 128 is formed of a steel alloy. In alternative embodiments, piston rod 128 is formed of any metal material such as, for example, titanium and aluminum.

In the exemplary embodiment, first coil winding 168 is coupled to housing 106 such that first coil winding 168 circumscribes piston rod 128 when piston rod 128 is in the extended position (shown in FIG. 1) and the retracted position (shown in FIG. 2). More specifically, in the exemplary embodiment, rod end 118 includes a coil platform 172 circumscribing rod bay 150. First coil winding 168 is coupled to coil platform 172 such that first coil winding 168 circumscribes piston rod 128 when piston rod 128 is in the extended position (shown in FIG. 1) and the retracted position (shown in FIG. 2). A gap 174 is defined between piston rod 128 and coil platform 172. In alternative embodiments, first coil winding 168 is coupled to housing 106 between rod bay 150 and rod end 118 (shown in FIG. 1). In further alterative embodiments, first coil winding 168 is coupled to housing 106 at any position that enables linear drive system 100 to function as described herein. In the exemplary embodiment, first coil winding 168 includes a first end 167 and a second end 169. First end 167 and second end 169 of first coil winding 168 are each connected to a first coaxial wiring 182. First coaxial wiring 182 extends between first end 167 and second end 169 of first coil winding 168 and a coaxial connector 184 accessible at the outer surface 112 of housing 106 to facilitate communicatively coupling an interrogator (shown in FIG. 5) to first coaxial wiring 182.

In the exemplary embodiment, second coil winding 170 is coupled to piston rod 128 such that second coil winding 170 circumscribes piston rod 128. In particular, in the exemplary embodiment, piston rod 128 includes an outer surface 129. Second coil winding 170 is wound around, and directly contacts outer surface 129 of piston rod 128. In further alternative embodiments, second coil winding 170 is coupled to piston rod 128 in any manner that enables linear drive system 100 to function as described herein. In the exemplary embodiment, a sensor 176 is coupled to outer surface 129 of piston rod 128 proximate second coil winding 170. In particular, in the exemplary embodiment, second coil winding 170 is electrically coupled to radio frequency (RF) sensor 176. In alternative embodiments, sensor 176 is any sensor that enables piston rod monitoring system 101 to function as described in. In further alternative embodiments, a coil housing (not shown) is coupled to piston rod 128 and shields second coil winding 170 and RF sensor 176 from contacting fluid 110. In yet further alternative embodiments, RF sensor 176 is coupled to piston rod 128 in any manner that enables RF sensor 176 to function as described herein. For example, and without limitation, in some alternative embodiments, RF sensor 176 is embedded in piston rod 128.

During operation, interrogator system 166 supplies current to first coil winding 168 (i.e., transmits an electrical input signal). The current through first coil winding 168 produces a magnetic field around first coil winding 168. The magnetic field around first coil winding 168, in turn, induces an electrical signal (e.g., in the form voltage) corresponding to the electrical input signal, within piston rod 128. In particular, the frequency of the electrical signal generated within piston rod 128 corresponds to the frequency of the electrical input signal. In other words, in the exemplary embodiment, the configuration of the first coil winding 168 around piston rod 128 allows for the electrical input signal to pass from first coil winding 168 to piston rod 128 (e.g., by generating an electrical signal within piston rod 128 having a frequency corresponding to the frequency of the electrical input signal).

In the exemplary embodiment, the electrical input signal within piston rod 128 is transmitted to second coil winding 170. In particular, due, at least in part, to the electromagnetic permeability of piston rod 128, the electrical input signal propagates through piston rod 128 to second coil winding 170, thereby generating a current within second coil winding 170 (i.e., a second electrical input signal based the electrical input signal transmitted to first coil winding 168). Second coil winding 170 is coupled to RF sensor 176 and configured to transmit the electrical input signal to RF sensor 176.

In the exemplary embodiment, RF sensor 176 is configured to generate and transmit, in response to receiving the electrical input signal an electrical output signal through second coil winding 170. In particular, as described in greater detail below with respect to FIG. 5, RF sensor 176 is configured to generate an electrical output signal associated with a characteristic of piston rod 128. In the exemplary embodiment, the electrical output signal, upon being transmitted to second coil winding 170, propagates through piston rod 128 and affects the magnetic field around first coil winding 168. In particular, the electrical output signal propagating through piston rod 128 affects the magnetic field around first coil winding 168, which, in turn, generates current within first coil winding 168, having a frequency corresponding to the electrical output signal. Thus, in the exemplary embodiment, first coil winding 168 is inductively coupled to second coil winding 170 through piston rod 128. In alternative embodiments, first coil winding 168 is inductively coupled to second coil winding 170 in any manner that enables piston rod monitoring system 101 to function as described herein.

In the exemplary embodiment, the location of RF sensor 176 on piston rod 128 provides for direct measurement of piston rod strain, and piston rod load calculated from piston rod strain. In the exemplary embodiment, RF sensor 176 is a surface acoustic wave sensor. More specifically, RF sensor 176 is an all-quartz-package sensor, i.e., a sensor sealed between a quartz substrate and a second quartz layer. In alternative embodiments, RF sensor 176 is another type of sensor, such as, for example, and without limitation, a strain gauge, a microelectromechanical system (MEMS) sensor, a temperature sensor, e.g., a thermocouple, an accelerometer, or a gyroscope.

Figure 4:
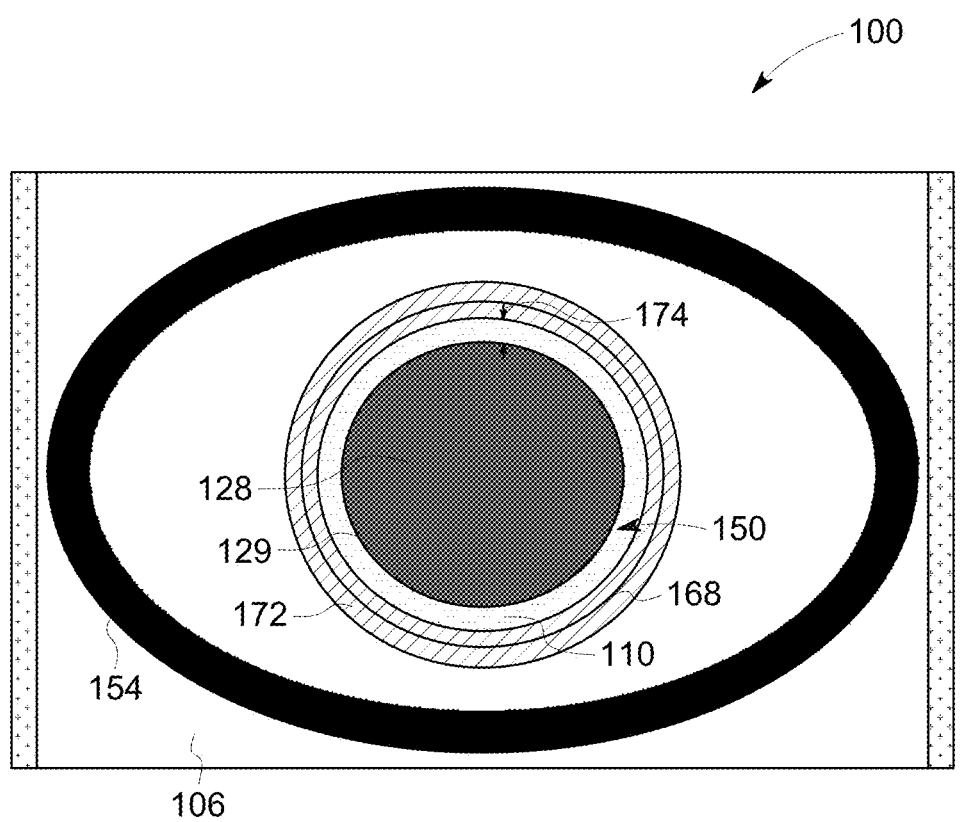
FIG. 4 is a schematic, sectional view of the linear drive system shown in FIG. 1 and taken along the line 4-4.

FIG. 4 is a schematic, sectional view of linear drive system 100 shown in FIG. 1 and taken along the line 4-4. In the exemplary embodiment, piston rod 128 is received within rod bay 150 defined in housing 106. Coil platform 172 is fixedly coupled to housing 106 and circumscribes rod bay 150. First coil winding 168 is coupled to coil platform 172 such that first coil winding 168 circumscribes piston rod 128. More specifically, in the exemplary embodiment, first coil winding 168 extends circumferentially within coil platform 172 such that at least a portion of coil platform 172 is positioned radially between first coil winding 168 and piston rod 128. In alternative embodiments, housing 106 does not include coil platform 172. For example, and without limitation, in at least some such embodiments, first coil winding 168 is coupled to housing 106 such that first coil winding 168 is positioned in rod bay 150. In further alternative embodiments, first coil winding 168 is coupled to housing 106 in any manner that enables first coil winding 168 to function as described herein. In the exemplary embodiment, rod end seal 154 circumscribes rod bay 150 and coil platform 172. In alternative embodiments, linear drive system does not include rod end seal 154.

In the exemplary embodiment, gap 174 is defined between piston rod 128 and coil platform 172. In particular, in the exemplary embodiment, piston rod 128 includes an outer surface 129. Piston rod 128 is supported within rod bay 150, e.g., by piston 126 (shown in FIG. 1) such that gap 174 is defined radially between, and circumferentially around, outer surface 129 and coil platform 172. More specifically, piston rod 128 is supported within rod bay 150 such that gap 174 is a sufficient distance for piston rod 128 to move linearly within rod bay 150 (i.e., into the page and out of the page as shown in FIG. 4) without directly contacting coil platform 172. Gap 174 is also a small enough distance to enable transmission of the electrical input signal between first coil winding 168 and piston rod 128, as described above. In the exemplary embodiment, gap 174 is approximately 0.1 inches or about 2.5 centimeters. In alternative embodiments, piston rod 128 is supported within rod bay 150 such that gap 174 is any distance that enables linear drive system 100 to function as described herein.

Figure 5:
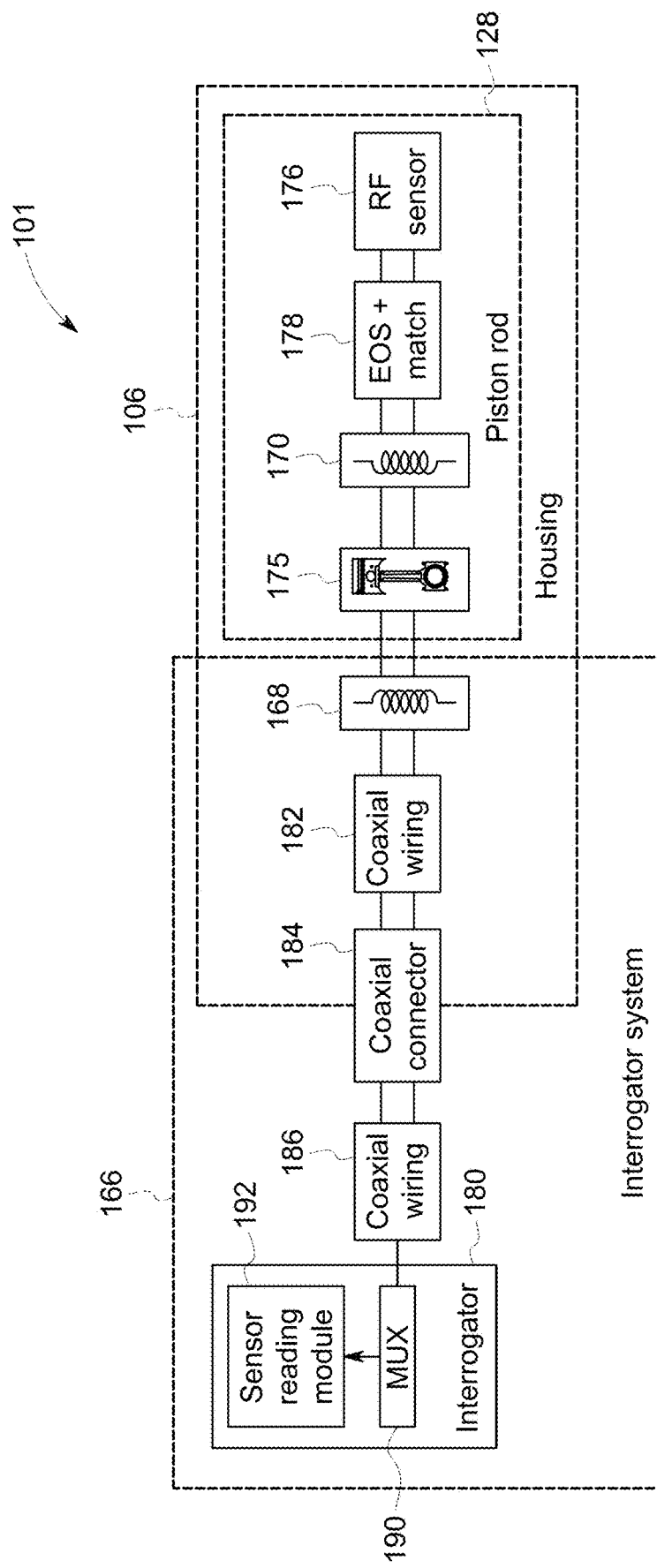
FIG. 5 is a block diagram of the piston rod monitoring system shown in FIG. 1.

FIG. 5 is a block diagram of piston rod monitoring system 101. Piston rod monitoring system 101 includes RF sensor 176 coupled to piston rod 128 for measuring a characteristic of piston rod 128. RF sensor 176 is coupled to second coil winding 170 for input to RF sensor 176 and output from RF sensor 176. In the exemplary embodiment, RF sensor 176 is coupled to an electrical over-stress (EOS) and impedance matching circuit 178 positioned between RF sensor 176 and second coil winding 170. EOS and impedance matching circuit 178 enhances power transmission and coupling between first coil winding 168 and second coil winding 170. In alternative embodiments, RF sensor 176 is coupled directly to second coil winding 170. Second coil winding 170 is inductively coupled to first coil winding 168 via a body 175 of piston rod 128. First coil winding 168 is coupled to interrogator 180 by a first coaxial wiring 182, a coaxial connector 184, and second coaxial wiring 186. Interrogator 180 interrogates RF sensor 176 by transmitting the electrical input signal to first coil winding 168, which is then transmitted to body 175 of piston rod 128, second coil winding 170, and RF sensor, as described above with respect to FIG. 3. Interrogator 180 further receives information from RF sensor 176, in the form of an electrical output signal transmitted by RF sensor 176. Interrogator 180 includes multiplexer 190 and sensor reading module 192. Multiplexer 190 facilitates collection of information from RF sensor 176 and sensor reading module 192 analyzes or otherwise processes the information received from RF sensor 176. Interrogator 180, or a subset of components thereof, forms a data acquisition system coupled to one or more of first coil winding 168 and coupled to a computing device.

In one embodiment, RF sensor 176 is a surface acoustic wave sensor. For example, and without limitation, RF sensor 176 includes a piezoelectric substrate (not shown), a first interdigitated transducer (IDT) (not shown) coupled to the piezoelectric substrate, and a second IDT (not shown) coupled to the piezoelectric substrate and separated from the first IDT by a delay line region (not shown). The first IDT receives an electrical input signal and produces an acoustic wave, e.g., a surface mechanical wave. The second IDT converts the acoustic wave to an electrical output signal through the piezoelectric effect. The characteristics of the surface on which RF sensor 176 is coupled affect the surface mechanical wave produced by RF sensor 176. For example, and without limitation, pressure, strain, torque, temperature, and/or other characteristics or environmental conditions affecting piston rod 128 change one or more of the length of the delay line region and the spacing between interdigitated electrodes of the first IDT and the second IDT. The electrical output signal generated by the second IDT from the surface mechanical wave is analyzed to determine characteristics of the electrical output signal such as, for example, and without limitation, phase-shift, frequency-shift, or time-delay. The electrical output signal is analyzed by sensor reading module 192 to determine the mechanical characteristics or other characteristics of piston rod 128.

In the exemplary embodiment, RF sensor 176 is charged via the inductive coupling between first coil winding 168 and second coil winding 170. In particular, in the exemplary embodiment, RF sensor 176 receives energy (e.g., from the electrical input signal) from second coil winding 170 and EOS and impedance matching circuit 178. RF sensor 176 uses the received energy to generate the surface mechanical wave using the first IDT. The second IDT converts the surface mechanical wave to the electrical output signal which is transmitted by second coil winding 170 to first coil winding 168 via the inductive coupling between first coil winding 168 and second coil winding 170. First coil winding 168 receives the electrical output signal transmitted by second coil winding 170. First coil winding 168 is coupled to first coaxial wiring 182 that extends at least partially though housing 106. First coaxial wiring 182 is coupled to coaxial connector 184 which is coupled to or extends partially through housing 106. Coaxial connector 184 is coupled to second coaxial wiring 186 which is coupled to interrogator 180. First coaxial wiring 182, coaxial connector 184, and second coaxial wiring 186 couple first coil winding 168 to interrogator 180 and provide for communication of power, the electrical input signal, and the electrical output signal.

In the exemplary embodiment, interrogator 180 includes MUX 190 and sensor reading module 192. MUX 190 multiplexes one or more of the electrical input signals and the electrical output signals. Sensor reading module 192 processes the electrical output signal to determine one or more characteristics associated with a component measured by RF sensor 176, e.g., and without limitation, piston rod 128. For example, and without limitation, sensor reading module 192 is or is included in one or more computing devices and may be implemented by a combination of one or more of software and hardware components. Software components include one or more of programs, application, processor executable code, modules, and other software components. Hardware components include memory devices such as volatile or non-volatile memory, random access memory, a hard drive, flash memory, or other hardware for storing information. Hardware components include processing devices such as a processor, a field programmable gate array, a programmable logic controller, or other hardware for processing one or more of instructions and information stored in memory or received. Hardware components may further input/output devices such as serial ports, Universal Serial Bus port, mouse, keyboard, display, or other input/output hardware.

Sensor reading module 192 determines, for example, and without limitation, strain of piston rod 128 from the electrical output signal using a calibration curve, function, equation, or formula that relates a property of the electrical output signal to strain. For example, and without limitation, the property of the electrical output signal is a phase-shift between the electrical input signal and the electrical output signal, a frequency-shift between the electrical input signal and the electrical output signal, or a time delay between the electrical input signal and the electrical output signal. In some embodiments, sensor reading module 192 can measure other characteristics such as temperature, torque, or pressure. Sensor reading module 192 determines a condition of piston rod 128. For example, and without limitation, sensor reading module 192 determines piston rod 128 load using a calibration curve, function, equation, or other formula that relates strain to load, e.g., and without limitation, calculating load from strain, a known Young's modulus, and a known sectional area of piston rod 128. In further embodiments, sensor reading module 192 determines a condition of piston rod 128 including whether piston rod 128 is in a normal condition or is not in normal condition such as a forecasted significant reduction in service life condition. Sensor reading module 192 determines the condition, normal or not normal, based on a measured characteristic, e.g., strain, or a determined condition, e.g., stress or load. For example, and without limitation, sensor reading module 192 determines that piston rod 128 is in a normal condition by comparing a stress of piston rod 128, determined from a measured strain characteristic, to a predetermined threshold value and determining that the stress of piston rod 128 is less than the predetermined threshold value.

In alternative embodiments, RF sensor 176 includes a power source or is coupled to a power source also coupled to piston rod 128. For example, and without limitation, in some such embodiments, RF sensor 176 is coupled to a battery (not shown). In further alternative embodiments, one or more components of interrogator 180 are included in a computing device. For example, and without limitation, in some such embodiments, sensor reading module 192 is a program stored in memory and executed by a processor of a computing device. The computing device is coupled to a separate MUX 190 by a wired or wireless connection. Alternatively, interrogator 180 is an application specific integrated circuit that interrogates RF sensor 176. Interrogator 180 provides an output, e.g., and without limitation, a determined piston rod load or other condition, through a wired or wireless connection to a separate computing device.

In operation, piston rod 128 moves in translation relative to housing 106 as piston 126 (shown in FIG. 1) and, more specifically, pressure from fluid 110 (shown in FIG. 1) acting on piston 126, drives piston rod 128. Translation of piston rod 128 results in translation of second coil winding 170, coupled to piston rod 128, relative to first coil winding 168. In the exemplary embodiment, piston rod monitoring system 101 is configured such that the translation of second coil winding 170 relative to first coil winding 168 does not substantially interfere with communication between interrogator 180 and RF sensor 176. In particular, in the exemplary embodiment, interrogator 180 is configured to determine a condition of piston rod 128 by comparing the frequency of the electrical input signal with the frequency of the electrical output signal. In alternative embodiments, interrogator 180 is configured to determine a condition of piston rod in any manner that enables piston rod monitoring system 101 to function as described herein. For example, and without limitation, in some alternative embodiments, interrogator 180 is configured to determine a condition of piston rod 128 by comparing the amplitude of the electrical input signal with the amplitude of the electrical output signal.

Second coil winding 170 is configured, as described herein, to communicate with first coil winding 168 through the range of translational movement relative to first coil winding 168. For example, and without limitation, the properties of one or more of first coil winding 168 and second coil winding 170 allow for communication at any point in the range of translation of second coil winding 170. Therefore, second coil winding 170, as described herein, provides for communication between first coil winding 168 and second coil winding 170, during relative translational movement, and allows for the functions described herein.

Figure 6:
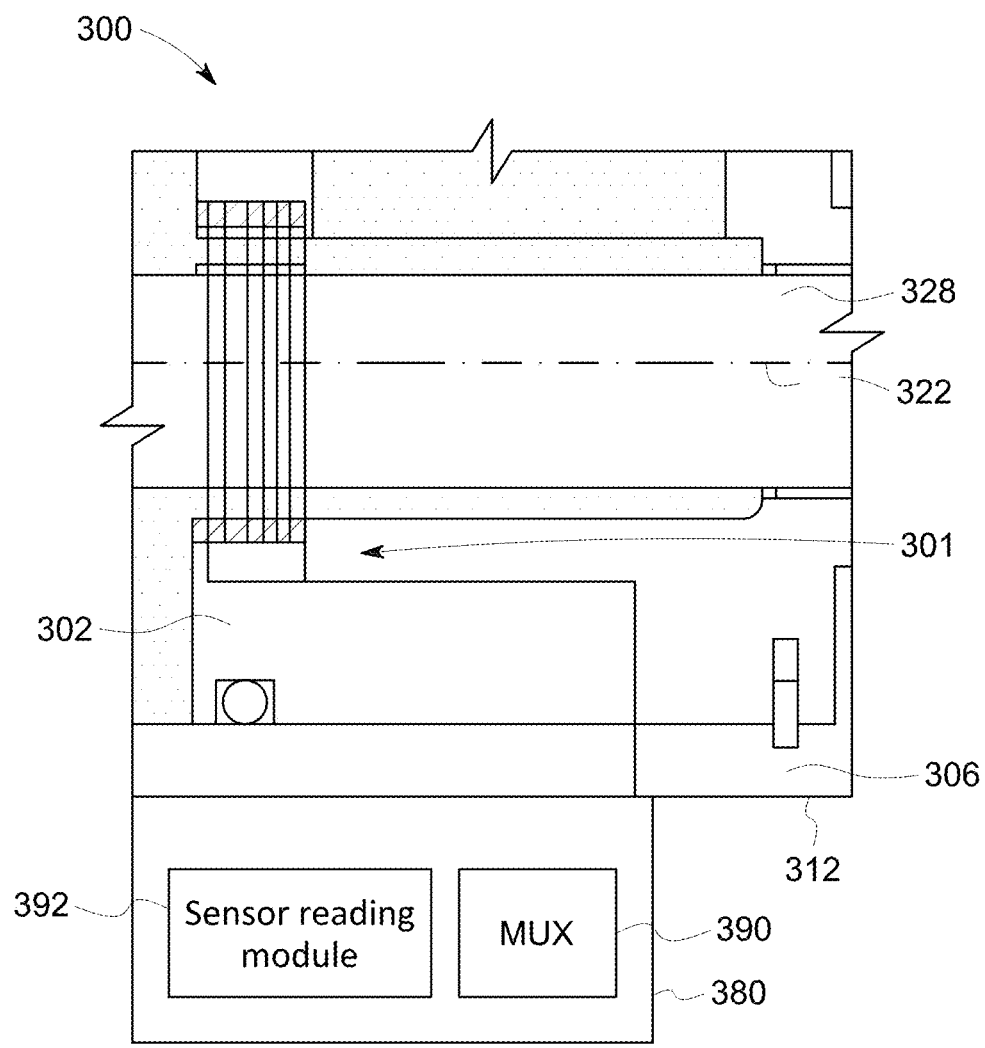
FIG. 6 is a schematic, sectional view of a portion of an alternative linear drive system in an extended position including an alternative piston rod monitoring system.

FIG. 6 is a schematic, sectional view of a portion of an alternative linear drive system 300 in an extended position including an alternative piston rod monitoring system 301. Alternative linear drive system 300 shown in FIG. 6 is substantially similar to linear drive system 100 described above with respect to FIGS. 1-3, except as described below. In particular, in the exemplary embodiment, linear drive system 300 includes an interrogator 380 integrally formed with a linear actuator 302. More specifically, in the exemplary embodiment, interrogator 80 is fixedly coupled to an outer surface 312 of a housing 106 of linear actuator 302.

In the exemplary embodiment, integrally forming interrogator 380 with linear actuator 302 allows for providing real-time monitoring and control (i.e., closed loop feedback) of linear actuator 302. For example, and without limitation, in the exemplary embodiment, a fluid supply system (similar to fluid supply system 104 shown in FIG. 1) is coupled in communication with interrogator 380 or, more specifically, a sensor reading module 392 of interrogator 380. The fluid supply system is configured to receive information regarding the condition of a piston rod 328 of linear actuator 302 from sensor reading module 392 and control operation of linear actuator 302 in response to receiving the information. For example, and without limitation, in some embodiments, linear drive system 300 is an automated active suspension system for a motor vehicle. In some such embodiments, providing closed loop feedback allows for providing negative feedback (e.g., via control of linear actuator 302) to shock absorbers of the motor vehicle to allow for real time adjustment of shock absorbers on uneven surfaces. In addition, in some embodiments, at least in part due to integrally forming interrogator 380 with linear actuator 302, linear drive system 300 is configured for at least one of electrical interface of the actuator through digital communication interfaces such as a Controller Area Network ("CAN bus"), Modbus, etc., performing self-testing and diagnostics, and to allow for calibration data to be stored on one of the interrogator 380 and linear actuator 302.

Figure 7:
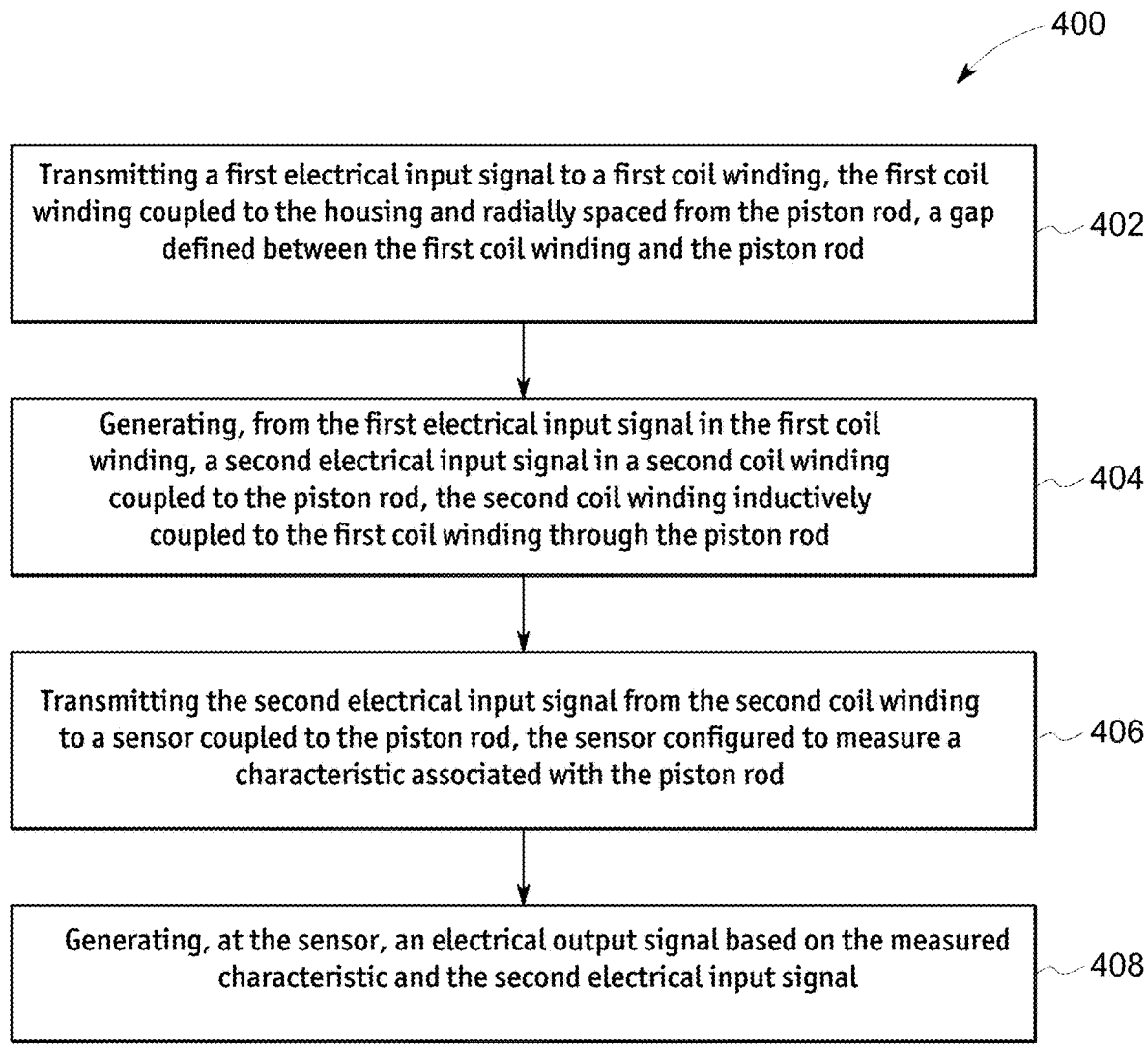
FIG. 7 is a flow diagram of an exemplary method for monitoring a condition of a piston rod of the linear drive system shown in FIG. 1.

FIG. 7 is a flow diagram of an exemplary method 400 for monitoring a condition of piston rod 128 of linear drive system 100 (shown in FIG. 1). Method 400 includes transmitting 402 a first electrical input signal to first coil winding 168, first coil winding 168 coupled to housing 106 and radially spaced from piston rod 128, a gap 174 is defined between first coil winding 168 and piston rod 128. Method 400 also includes generating 404, from the first electrical input signal in first coil winding 168, a second electrical input signal in second coil winding 170 coupled to piston rod 128, second coil winding 170 inductively coupled to the first coil winding 168 through the piston rod 128. Method 400 further includes transmitting 406 the second electrical input signal from second coil winding 170 to sensor 176 coupled to piston rod 128, sensor 176 configured to measure a characteristic associated with piston rod 128. Method 400 also includes generating 408, at sensor 176, an electrical output signal based on the measured characteristic and the second electrical input signal.

An exemplary technical effect of the methods, systems, and apparatus described herein includes at least one of: (a) improved monitoring of piston rods within linear drive systems; (b) reduced maintenance and servicing for piston rods; (c) improved sensing of piston rod in a liquid fluid filled environment; and (d) improved control of linear drive systems based on monitored characteristics of piston rod.

Exemplary embodiments of sensor systems, linear drive systems, and methods for methods for determining a condition of a piston rod within a housing, are described above in detail. The methods and systems are not limited to the specific embodiments described herein, but rather, components of systems and/or steps of the methods may be utilized independently and separately from other components and/or steps described herein. For example, the method may also be used in combination with other linear drive systems, and are not limited to practice only with the linear drive system as described herein. Rather, the exemplary embodiment can be implemented and utilized in connection with many other linear drive applications.

Although specific features of various embodiments of the disclosure may be shown in some drawings and not in others, this is for convenience only. In accordance with the principles of the disclosure, any feature of a drawing may be referenced and/or claimed in combination with any feature of any other drawing.

This written description uses examples to disclose the embodiments, including the best mode, and also to enable any person skilled in the art to practice the embodiments, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A sensor system for monitoring a condition of a piston rod positioned within a housing, said sensor system comprising:
   an interrogator system including a first coil winding coupled to the housing and radially spaced from the piston rod such that a gap is defined between said first coil winding and the piston rod;
   a second coil winding coupled to the piston rod, said second coil winding inductively coupled to said first coil winding and configured to communicate with said first coil winding through a range of linear movement of the piston rod relative to the housing, said piston rod formed of a material having an electromagnetic permeability that is higher than an electromagnetic permeability of atmospheric air; and
   a sensor coupled to said second coil winding, said sensor to measure a characteristic associated with said piston rod and generate a current in said second coil winding to transmit, via the inductive coupling with said first coil winding and the electromagnetic permeability of said piston rod, an electrical output signal associated with the characteristic to said interrogator system.

2. The sensor system in accordance with claim 1, wherein said first coil winding and said second coil winding are inductively coupled through the piston rod.

3. The sensor system in accordance with claim 2, wherein said first coil winding and said second coil winding are inductively coupled such that said first coil winding, in response to receiving an electrical input signal, generates an electrical signal within the piston rod corresponding to the electrical input signal.

4. The sensor system in accordance with claim 1, wherein said first coil winding is radially spaced from the piston rod such that the gap extends circumferentially around the piston rod and radially between the piston rod and said first coil winding.

5. The sensor system in accordance with claim 4, further including a fluid contained within the gap between the piston rod and said first coil winding.

6. The sensor system in accordance with claim 5, wherein said fluid is a dielectric liquid.

7. The sensor system in accordance with claim 5, wherein said fluid is a gas.

8. The sensor system in accordance with claim 1, wherein said sensor is a surface acoustic wave sensor, wherein the characteristic measured by said sensor is at least one of a pressure, a strain, a torque, and a temperature, wherein the sensor system is to monitor the condition of the piston rod based on the characteristic, and wherein the condition is at least one of a piston rod load, a piston rod stress, a normal condition, and a reduction in service life condition.

9. A linear drive system comprising:
   a housing defining a bore;
   a piston rod positioned at least partially within the bore and translatable within the bore, said piston rod formed of a material an electromagnetic permeability that is higher than an electromagnetic permeability of air; and
   a sensor system for monitoring a condition associated with said piston rod, said sensor system including:
     an interrogator system including a first coil winding coupled to said housing and radially spaced from said piston rod such that a gap is defined between said first coil winding and said piston rod;
   a second coil winding coupled to said piston rod, wherein said second coil winding is inductively coupled to said first coil winding and configured to communicate with said first coil winding through a range of linear movement of said piston rod relative to said housing; and
   a sensor coupled to said second coil winding and said piston rod, said sensor configured to measure a characteristic associated with said piston rod and generate a current in said second coil winding to transmit, by the inductive coupling with said first coil winding and the electromagnetic permeability of said piston rod, an electrical output signal associated with the characteristic to said interrogator system.

10. The linear drive system in accordance with claim 9, further including a fluid supply system coupled to said housing and configured to supply a fluid to said housing to drive said piston rod relative to said housing.

11. The linear drive system in accordance with claim 10, wherein said housing defines an extension flow port and a retraction flow port in fluid communication with the bore, wherein said fluid supply system further includes a motor driven pump, a first supply line extending between the extension flow port and said motor driven pump, and a second supply line extending between the retraction flow port and said motor driven pump.

12. The linear drive system in accordance with claim 9, wherein first coil winding and said second coil winding are inductively coupled through said piston rod.

13. The linear drive system in accordance with claim 12, wherein said first coil winding and said second coil winding are inductively coupled such that said first coil winding, in response to receiving an electrical input signal, is configured to generate an electrical signal within said piston rod corresponding to the electrical input signal.

14. The linear drive system in accordance with claim 9, wherein said first coil winding is radially spaced from said piston rod such that the gap extends circumferentially around said piston rod and radially between said piston rod and said first coil winding.

15. The linear drive system in accordance with claim 14, further including a fluid contained within the gap between said piston rod and said first coil winding.

16. The linear drive system in accordance with claim 15, wherein said fluid is a dielectric liquid.

17. The linear drive system in accordance with claim 15, wherein said fluid is a gas.

18. The linear drive system in accordance with claim 9, wherein said sensor is a surface acoustic wave sensor, wherein the characteristic measured by said sensor is at least one of a pressure, a strain, a torque, and a temperature, wherein said sensor system is configured to monitor the condition of said piston rod based on the characteristic, and wherein the condition is at least one of a piston rod load, a piston rod stress, a normal condition, and a reduction in service life condition.

19. The linear drive system in accordance with claim 9, wherein said interrogator system further includes an interrogator electrically coupled to said first coil winding, said interrogator including a multiplexer and a sensor reading module.

20. A method for monitoring a condition of a piston rod positioned within a housing, said method comprising:
- transmitting a first electrical input signal to a first coil winding, the first coil winding coupled to the housing and radially spaced from the piston rod, a gap defined between the first coil winding and the piston rod, the piston rod is made of a material having an electromagnetic permeability that is higher than an electromagnetic permeability of atmospheric air;
- generating, from the first electrical input signal in the first coil winding, a second electrical input signal in a second coil winding coupled to the piston rod, the second coil winding inductively coupled to the first coil winding through the piston rod, the first coil winding to transmit the second electrical input signal to the second coil winding via the inductive coupling and the electromagnetic permeability of the piston rod;
- transmitting the second electrical input signal from the second coil winding to a sensor coupled to the piston rod, the sensor configured to measure a characteristic associated with the piston rod; and
- generating, at the sensor, an electrical output signal based on the measured characteristic and the second electrical input signal for transmission to the first coil winding via and the electromagnetic permeability of the piston rod.

* * * * *